US012500869B2

(12) United States Patent
Krohn

(10) Patent No.: US 12,500,869 B2
(45) Date of Patent: Dec. 16, 2025

(54) LOCKING ENCRYPTED VIDEO CONFERENCES

(71) Applicant: Zoom Video Communications, Inc., San Jose, CA (US)

(72) Inventor: Max Krohn, New York City, NY (US)

(73) Assignee: Zoom Communications, Inc., San Jose, CA (US)

( * ) Notice: Subject to any disclaimer, the term of this patent is extended or adjusted under 35 U.S.C. 154(b) by 212 days.

(21) Appl. No.: 18/239,215

(22) Filed: Aug. 29, 2023

(65) Prior Publication Data

US 2024/0007446 A1 Jan. 4, 2024

Related U.S. Application Data

(63) Continuation of application No. 17/850,817, filed on Jun. 27, 2022, now Pat. No. 11,750,578, which is a (Continued)

(51) Int. Cl.
*H04L 9/40* (2022.01)
*H04L 9/08* (2006.01)
(Continued)

(52) U.S. Cl.
CPC ........ *H04L 63/0428* (2013.01); *H04L 9/0819* (2013.01); *H04L 65/403* (2013.01); *H04N 7/15* (2013.01)

(58) Field of Classification Search
CPC ....... G07C 9/21; H04L 9/0819; H04L 9/0833; H04L 9/0838; H04L 9/0861; H04L 9/088;
(Continued)

(56) References Cited

U.S. PATENT DOCUMENTS 9,210,378 B2 * 12/2015 Leske ...................... H04N 7/15
10,237,268 B2 * 3/2019 Price ..................... H04L 63/083
(Continued)

FOREIGN PATENT DOCUMENTS

CN 101873466 A 10/2010
GB 2598897 A 3/2022

OTHER PUBLICATIONS

"Meeting Security Features", retrieved from: https://support.bluejeans.com/s/article/Meeting-Security-Features, Apr. 20, 2020, 2 pages.
(Continued)

*Primary Examiner* — Gerald Gauthier
(74) *Attorney, Agent, or Firm* — Kilpatrick Townsend & Stockton LLP

(57) ABSTRACT

One disclosed example method includes receiving, during a first encrypted video conference including a plurality of participants, a request to admit an additional participant to the encrypted video conference; determining whether the additional participant is one of the plurality of participants. The example method further includes, responsive to determining that the additional participant is not one of the plurality of participants, ending the first encrypted video conference; obtaining a meeting cryptographic key; distributing the meeting cryptographic key to each participant of the plurality of participants; and initiating a second encrypted video conference including the plurality of participants.

20 Claims, 6 Drawing Sheets

Related U.S. Application Data continuation of application No. 17/162,400, filed on Jan. 29, 2021, now Pat. No. 11,374,911.

(51) Int. Cl.
*H04L 65/403* (2022.01)
*H04N 7/15* (2006.01)

(58) Field of Classification Search
CPC ..... H04L 9/3247; H04L 9/40; H04L 12/1818; H04L 12/1822; H04L 63/0428; H04L 63/065; H04L 63/083; H04L 63/104; H04L 65/1069; H04L 65/403; H04L 67/535; H04N 7/147; H04N 7/15; H04N 7/155; H04Q 11/047; H04Q 11/0478; A63F 13/215; G06F 3/04842; G06F 21/6245; G06Q 20/4014; H04M 3/568
See application file for complete search history.

(56) References Cited

U.S. PATENT DOCUMENTS

| | | | | |
|---|---|---|---|---|
| 10,264,215 | B1* | 4/2019 | Sadanand | G06Q 20/4014 |
| 10,523,657 | B2* | 12/2019 | Reddy | H04L 65/403 |
| 11,374,911 | B1* | 6/2022 | Krohn | H04L 63/104 |
| 11,688,522 | B2* | 6/2023 | DeBates | A61B 5/7435 348/14.03 |
| 11,750,578 | B2* | 9/2023 | Krohn | H04L 65/403 348/14.03 |
| 2005/0015444 | A1* | 1/2005 | Rambo | G06F 3/04842 348/E7.083 |
| 2005/0089052 | A1* | 4/2005 | Chen | H04Q 11/0478 370/329 |
| 2008/0037751 | A1 | 2/2008 | Aldrey et al. | |
| 2008/0183818 | A1 | 7/2008 | Farshchi et al. | |
| 2009/0054097 | A1 | 2/2009 | Kim et al. | |
| 2009/0154707 | A1 | 6/2009 | Lee et al. | |
| 2011/0182426 | A1* | 7/2011 | Roosta | H04L 63/104 380/255 |
| 2011/0300841 | A1* | 12/2011 | Archambault | H04L 12/1818 455/416 |
| 2013/0162754 | A1* | 6/2013 | Dye | H04M 3/568 348/14.08 |
| 2014/0168350 | A1* | 6/2014 | Rambo | H04N 7/155 348/14.03 |
| 2014/0321651 | A1 | 10/2014 | Hodges et al. | |
| 2015/0215580 | A1 | 7/2015 | Leske et al. | |
| 2016/0227171 | A1* | 8/2016 | Rambo | G06F 3/0486 |
| 2016/0307165 | A1* | 10/2016 | Grødum | H04N 7/15 |
| 2017/0142096 | A1 | 5/2017 | Reddy et al. | |
| 2017/0346851 | A1* | 11/2017 | Drake | H04L 9/0838 |
| 2018/0159841 | A1 | 6/2018 | Toff | |
| 2018/0331840 | A1 | 11/2018 | Sugano et al. | |
| 2019/0103984 | A1* | 4/2019 | Yang | H04L 63/065 |
| 2019/0140832 | A1* | 5/2019 | Leavy | H04L 9/3247 |
| 2019/0199965 | A1 | 6/2019 | Sadanand | |
| 2020/0228973 | A1* | 7/2020 | Kasabwala | H04L 9/0861 |
| 2020/0374489 | A1 | 11/2020 | Wood et al. | |
| 2020/0402674 | A1* | 12/2020 | DeBates | H04N 7/14 |
| 2021/0058433 | A1* | 2/2021 | Fer | H04L 63/065 |
| 2021/0373676 | A1* | 12/2021 | Jorasch | A63F 13/215 |
| 2021/0399911 | A1* | 12/2021 | Jorasch | H04L 12/1818 |
| 2021/0400142 | A1* | 12/2021 | Jorasch | H04L 65/1069 |
| 2022/0006789 | A1* | 1/2022 | Neumann | H04L 67/535 |
| 2022/0329574 | A1* | 10/2022 | Krohn | H04L 9/40 |
| 2023/0100246 | A1* | 3/2023 | DeBates | H04N 7/14 705/2 |
| 2024/0007446 | A1* | 1/2024 | Krohn | H04L 63/104 |
| 2024/0250936 | A1* | 7/2024 | Neumann | G06F 21/6245 |

OTHER PUBLICATIONS

"Secure Video Conferencing: What It Looks Like and How to Lock It Down", Retrieved from internet at, https://www.ringcentral.com/us/en/blog/secure-video-conferencing/, Retrieved on Jan. 7, 2021, 18 pages.

"UberConference, "Private Conference Calls"", https://www.uberconference.com/features/private_conference_calls, Retrieved on Nov. 27, 2020, 5 pages.

U.S. Appl. No. 17/162,400, "Corrected Notice of Allowability", Jun. 2, 2022, 3 pages.

U.S. Appl. No. 17/162,400, "Non-Final Office Action", Jul. 22, 2021, 19 pages.

U.S. Appl. No. 17/162,400, "Notice of Allowance", Feb. 25, 2022, 6 pages.

U.S. Appl. No. 17/850,817, "Non-Final Office Action", Jan. 20, 2023, 8 pages.

U.S. Appl. No. 17/850,817, "Notice of Allowance", Apr. 27, 2023, 12 pages.

PCT Application No. PCT/US2022/012240, "International Preliminary Report on Patentability", Aug. 10, 2023, 14 pages.

PCT Application No. PCT/US2022/012240, "International Search Report and Written Opinion", May 3, 2022, 18 pages.

* cited by examiner

LOCKING ENCRYPTED VIDEO CONFERENCES

CROSS-REFERENCES

This application is a continuation of U.S. application Ser. No. 17/850,817, filed Jun. 27, 2022, entitled "LOCKING ENCRYPTED VIDEO CONFERENCES," which is a continuation of U.S. application Ser. No. 17/162,400, filed Jan. 29, 2021 and issued on Jun. 28, 2022 as U.S. Pat. No. 11,374,911, entitled "SYSTEM AND METHODS FOR LOCKING ENCRYPTED VIDEO CONFERENCES," the entirety of which is incorporated by reference herein.

FIELD

The present application generally relates to hosting or participating in video conferences and more particularly relates to systems and methods for locking encrypted video conferences.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for securely recording and retrieving encrypted video conferences. One disclosed example method includes receiving, during a first encrypted video conference including a plurality of participants, a request to admit an additional participant to the encrypted video conference; determining whether the additional participant is one of the plurality of participants. The example method further includes, responsive to determining that the additional participant is not one of the plurality of participants, ending the first encrypted video conference; obtaining a meeting cryptographic key; distributing the meeting cryptographic key to each participant of the plurality of participants; and initiating a second encrypted video conference including the plurality of participants.

One example system includes a non-transitory computer-readable medium; a communications interface; a microphone; an image sensor; and a processor communicatively coupled to the non-transitory computer-readable medium, the communications interface, the microphone, and the image sensor, the processor configured to execute processor-executable instructions stored in the non-transitory computer-readable medium to receive, during a first encrypted video conference including a plurality of participants, a request to admit an additional participant to the encrypted video conference; determine whether the additional participant is one of the plurality of participants, and responsive to determining that the additional participant is not one of the plurality of participants, end the first encrypted video conference; obtain a meeting cryptographic key; distribute the meeting cryptographic key to each participant of the plurality of participants; and initiate a second encrypted video conference including the plurality of participants.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
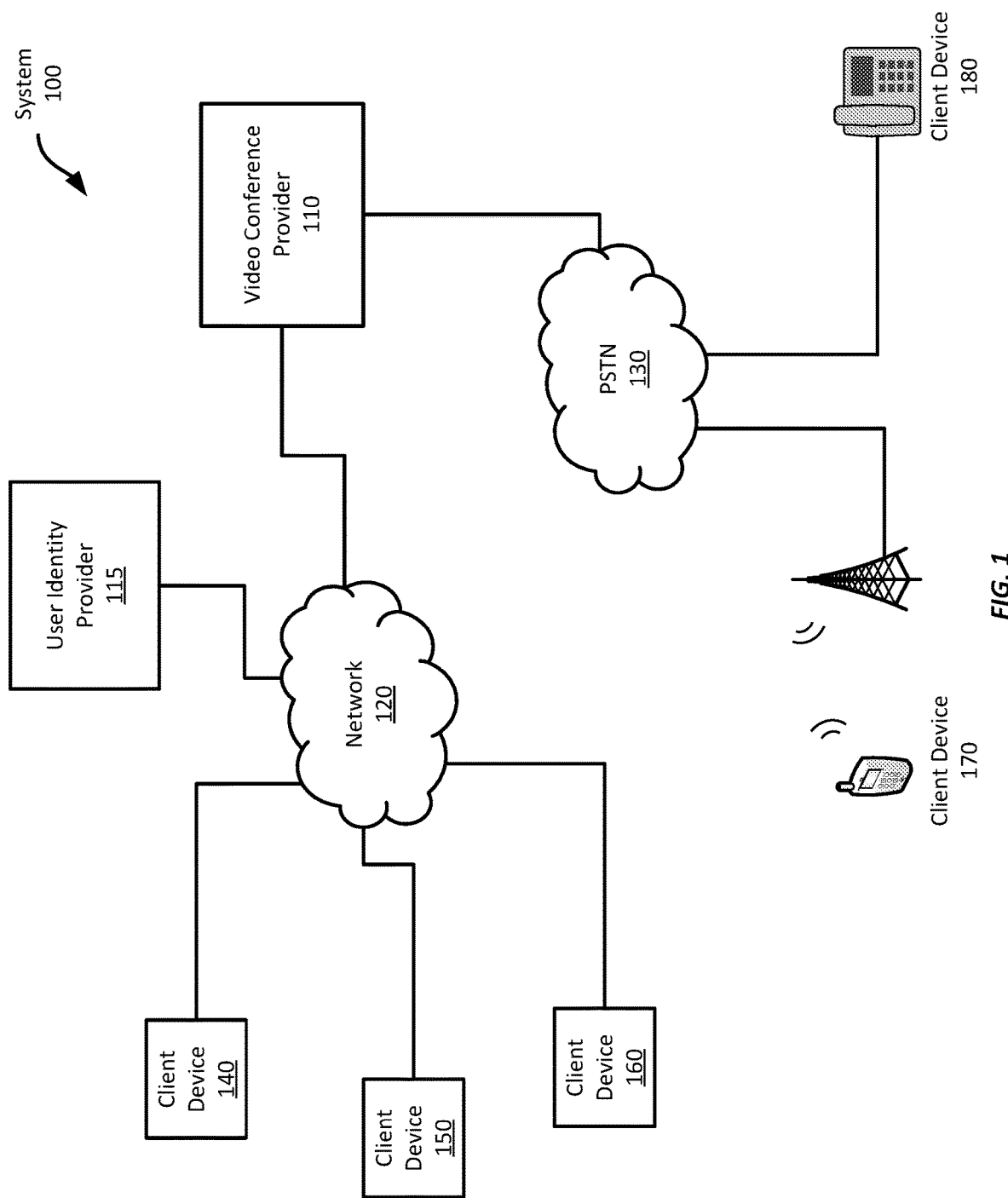
FIGS. 1-3 show example systems for locking encrypted video conferences.

Examples are described herein in the context of systems and methods for securely recording and retrieving encrypted video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

People participate in video conferences for a wide variety of reasons, such as to keep in touch with family, conduct business, or manage groups or organizations. In some cases, participants in a video conference may wish to keep the contents of the video conference confidential and only available to certain authorized personnel. This can be done by encrypting audio and video that is streamed between participants to a video conference, which may prevent potential eavesdroppers from accessing the streamed audio and video. Without the necessary decryption information, accessing the encrypted audio and video can be prohibitively computationally difficult. However, in some cases, uninvited participants may attempt to join an encrypted meeting in order to eavesdrop.

Such a scenario may be undesirable for any number of reasons. For example, in some cases the host may want to limit the participants of a video conference and exclude others who attempt to join the video conference. Typically, when a would-be participant attempts to join a meeting, the video conference provider presents the new participant to the meeting. However, the video conference provider's servers may be "untrusted" by the current participants, meaning the provenance and identity of the servers and would-be participants may not be verifiable by the current participants or may otherwise be suspect. In some cases, the audio or video may include confidential information that may not be shared with the video conference provider, e.g., by law or regulation. Further, the participants themselves may simply not want the video conference provider or unidentified participants to have access to the content of the video conference.

In such cases, an example system allows the host of a meeting to begin a meeting and admit participants and then select an option to lock the meeting, thereby prohibiting any additional participants from joining the meeting. The example system provides a notification to all current participants in the meeting that the meeting is now locked. And no additional participants are allowed to join.

In some example systems, current participants may be dropped from the meeting. In such cases, those participants are able to rejoin the in-progress video conference. In other example systems, if members drop, for instance the host, then the meeting is ended, and a new meeting is started automatically, which the participants can then join. Locking the encrypted video conference prevents both access to participants who may inadvertently be trying to access a meeting as well as cases in which someone is actively trying to access a meeting to which they should not have access.

To enable the video conference provider to provide an encrypted video conference and allow one or more participants to access it, the host initiates an end-to-end ("E2E") encrypted video conference. For example, the host may select an option on a user interface to initiate E2E encryption. Once the host initiates an E2E meeting, the host's client device 320 generates an encryption key or keys that will be used by participants of the meeting, referred to herein as "meeting keys." In the example system, the encryption keys are symmetric keys. The host's client device 320 can then use public key cryptography to distribute the symmetric keys to participants in the meeting. Once E2E encryption is enabled, the video conference provider 310 is not provided with the symmetric keys and thus merely relays the audio and video but is unable to decrypt the content of the audio and video.

In the example system, when the host locks the meeting, the host will no longer provide the meeting key to a would-be participant. Thus, the would-be participant cannot join the encrypted video conference and so cannot access the encrypted audio and video. However, the host will still allow dropped participants to be re-admitted.

Using such techniques, hosts and participants in a video conference may enjoy privacy for their communications and ensure that unwanted participants are not provided access to an encrypted video conference. Such techniques may be particularly advantageous in financial, legal, or medical organizations that must ensure some level of confidentiality. As noted above, this can help comply with various privacy regulations or ensure that other attempts to access the encrypted recording must be mediated by the host (or corresponding entity, such as the host's employer).

This illustrative example is given to introduce the reader to the general subject matter discussed herein and the disclosure is not limited to this example. The following sections describe various additional non-limiting examples and examples of systems and methods for securely recording and retrieving encrypted video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
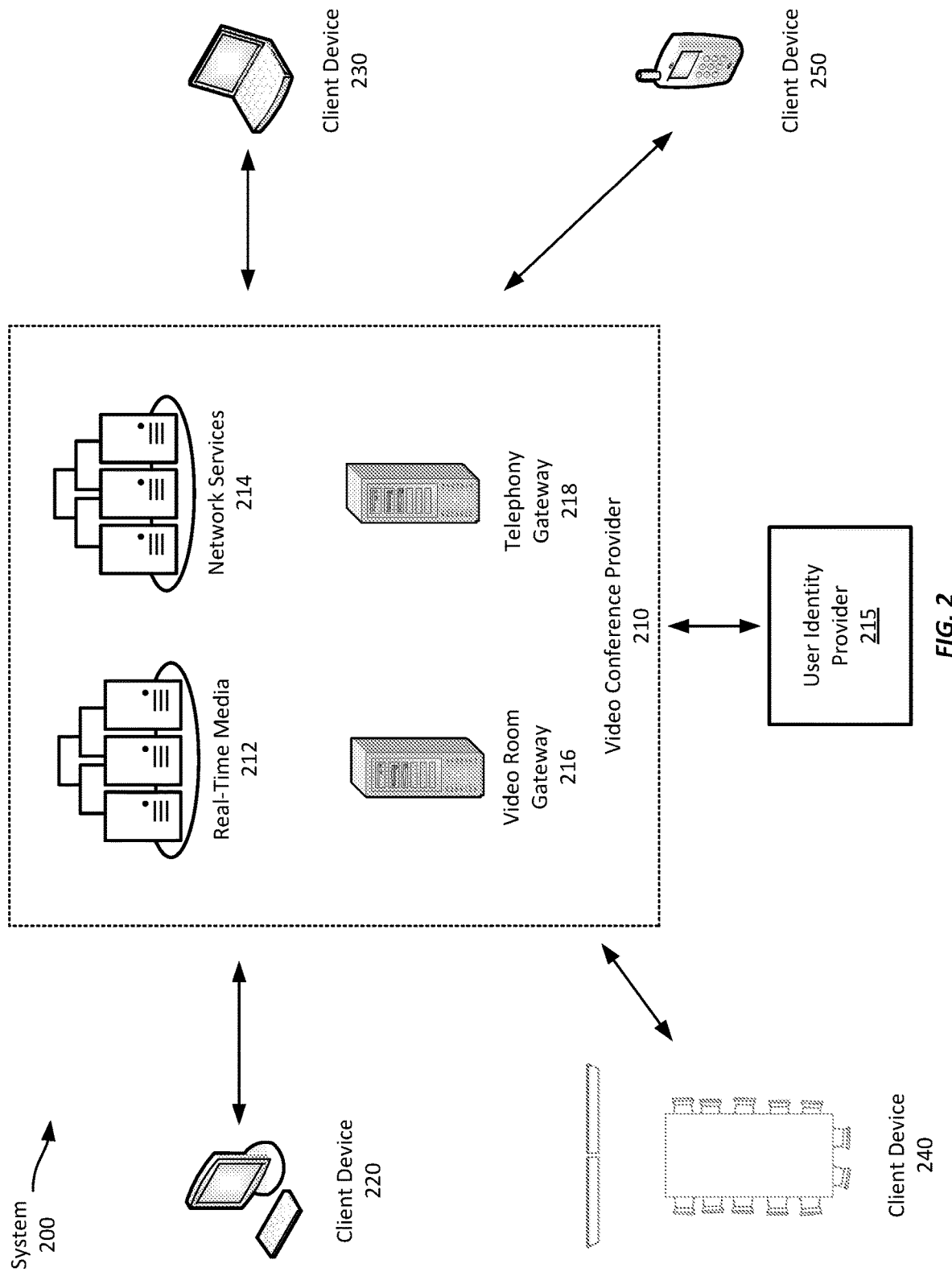

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
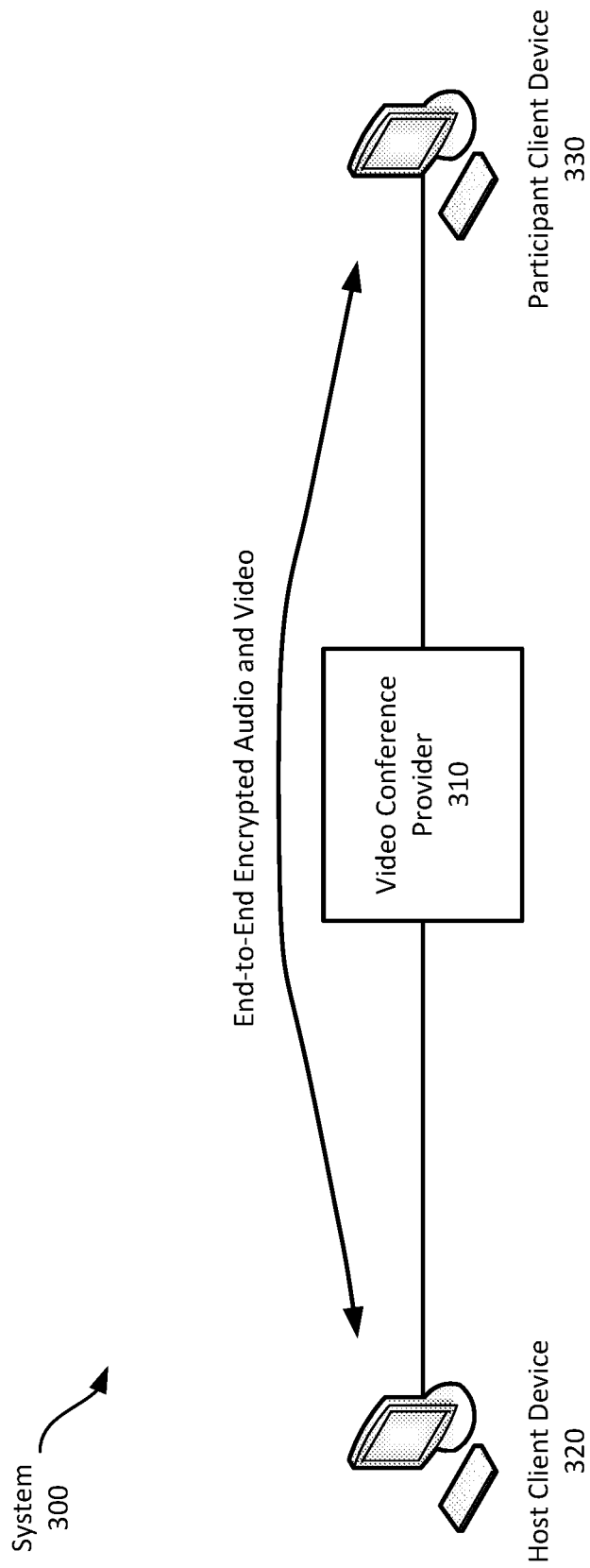

Referring now to FIG. 3, FIG. 3 illustrates a simplified system 300 that enables the users to engage in an end-to-end ("E2E") encrypted video conference. The system includes two client devices 320, 330 and a video conference provider 310. The client devices 320, 330 are connected to the video conference provider 310 through one or more communication networks (not shown), generally as described above with respect to FIGS. 1 and 2.

In an E2E-encrypted video conference, each participant joins the video conference with their respective client device 320-330 and the host establishes a meeting key that will be used to encrypt and decrypt the audio and video streams. Each of the participants also has their own respective public/private key pair that can be used to communicate with the respective participant and each participant's public key is published or distributed in any suitable manner, such as by registering it with a trusted entity or by generating a cryptographic signature using a private key and allowing the host or other participants to use a published copy of the public key to verify the signature.

Once each participant's public key has been verified, the host can securely distribute the meeting key to the participants by encrypting the meeting key using the participant's respective public keys. For example, the host may generate and send an encrypted message including the meeting key to each participant using the respective participant's public key. Upon receiving successfully decrypting the meeting key, the respective participants are then able to encrypt and decrypt meeting content.

In system 300 shown in FIG. 3, client device 320 initially connects to the video conference provider 310 and requests that the video conference provider create a new meeting. Once the meeting is created, client device 320 is designated as the host of the meeting and establishes a meeting key to use to provide for E2E encryption in the meeting, but does not provide it to the video conference provider 310. Subsequently, a participant client device 330 joins the meeting and generates and provides a cryptographically signed message using its private key to the host client device 320, which verifies the message using the participant's public key. After verifying the public key, the host client device 320 encrypts the meeting key using the participant's public key and transmits it to the participant client device 330, which decrypts the meeting key. Once the meeting key has been successfully received and decrypted by the participant client device 330, it may begin transmitting encrypted audio and video using the meeting key.

In this example, each participant generates a per-stream encryption key by computing a new key using a non-secret stream ID for each data stream it transmits (e.g., audio and video), and uses the corresponding stream encryption key to encrypt its audio and video stream(s). The video conference provider receives the various encrypted streams, multiplexes them generally as described above with respect to FIGS. 1 and 2, and distributes them to the various participating client devices 320, 330. The respective client devices 320, 330 can then use the meeting key to decrypt the incoming streams and view the content of the video conference.

However, as part of this process, the video conference provider 320 does not have access to the meeting key. Thus, the video conference provider 320 is unable to decrypt the various audio and video streams. But because the individual streams are separately received from the various participants, the video conference provider 320 is able to identify the source of each stream and therefore it can properly multiplex the streams for delivery to each participant.

Figure 4:
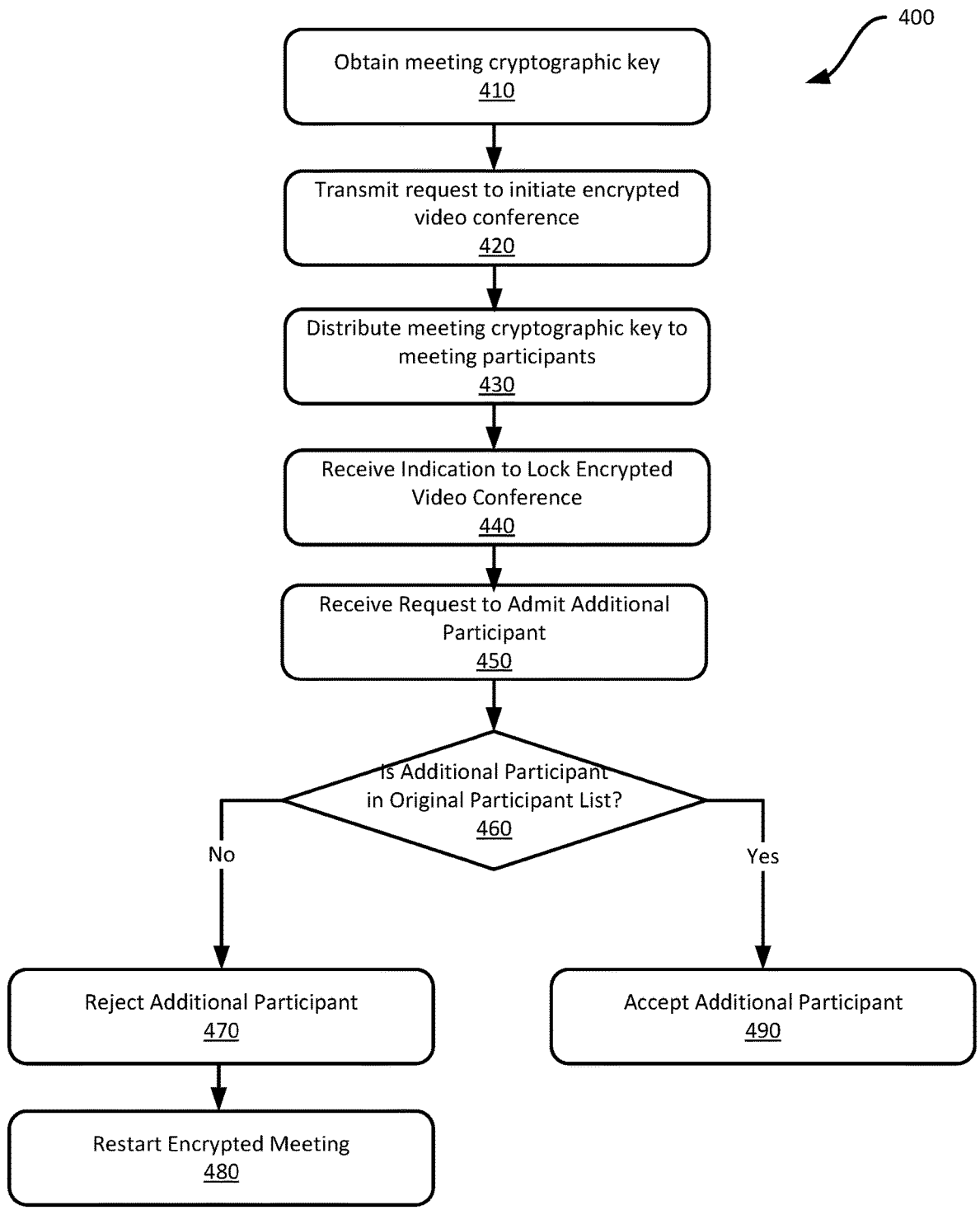
FIGS. 4-5 show example methods for locking encrypted video conferences.

Referring now to FIG. 4, FIG. 4 shows an example method 400 for locking an encrypted video conference. The method 400 of FIG. 4 will be described with respect to the systems shown in FIG. 3; however any suitable system according to this disclosure may be employed, including any of the systems shown in FIG. 1-3 or 6.

At block 410, the host's client device 320 obtains a meeting cryptographic key. Any suitable technique for generating a meeting cryptographic key may be employed. For example, the meeting cryptographic key may include a cryptographic key pair generated according to any suitable cryptographic key pair technique, such as using elliptic curves. In some examples, the meeting cryptographic key may a single cryptographic key.

At block 420, the host's client device 320 transmits a request to the video conference provider 310 to initiate an encrypted video conference. The request may identify certain meeting information, such as a meeting identifier and passcode. It may also include one or more options for the meeting, including an option to employ E2E encryption. Alternatively, the request to employ E2E encryption may be sent separately from the request to initiate the meeting.

At block 430, the host's client device 320 distributes the meeting cryptographic key to each participant of the plurality of participants. For example, the host's client device may obtain public cryptographic keys from each participant in the encrypted video conference and, for each participant, encrypt a copy of the meeting cryptographic key using the respective participant's public key. The host's client device 320 may then transmit each encrypted meeting cryptographic key to the respective participant based on the public key used.

The host's client device 320 also obtains a public cryptographic key of a cryptographic key pair. As at block 410, any suitable technique for generating a cryptographic key pair may be employed. In this example, a key pair is generated using an elliptic curve function and the host's client device 320 obtains one of the cryptographic keys of the cryptographic key pair, which becomes the public cryptographic key. The host's client device 320 then encrypts the meeting cryptographic key using the public cryptographic key.

At block 440, the host's client device 320 receives an indication that the encrypted video conference is to be locked. In other words, only the current participants of the encrypted video conference may access the video conference. No additional participants may join. In some example systems, when a current participant inadvertently leaves the encrypted video conference, for example, due to a poor internet connection, the current participant is able to rejoin the encrypted video conference in spite of the encrypted video conference being locked.

In one example, the host may select an option from the user interface of the video conferencing application executing on the host's client device 320, which triggers an indication to the video conferencing software. The video conferencing software executing on the host's client device 320 may in response send a notification to each participant in the video conference indicating that the video conference is now locked. In one example system, the notification is presented as an emoji on each participant's client device. In other examples, an overlay is displayed on the user interface indicating that the conference has been locked.

In some examples, the video conferencing software may automatically lock the video conference once all invited guests have joined the meeting. For example, the video conferencing software may access a meeting invitation or calendar entry that identifies one or more invitees to the meeting. In some examples, the video conferencing software may have generated and transmitted the invitations to the meeting. Thus, as participants join the meeting, the video conferencing software can track which participants have joined. Once the last participant has joined, the video conferencing software may receive the indication based on the last participant joining the meeting.

At block 450, the host's client device 320 receives a request to admit an additional participant. The request may be triggered by a would-be participant clicking a link and accessing a video conference provider 310, which then presents the additional participant to the encrypted video conference.

At block 460, the host's client device 320 determines whether this additional participant is in the original participant list. The original participant list is the list of participants who were attending the encrypted video conference when the host locked it. The participant list can include a public key to allow the participant list to be verified as genuine. As described above, an original participant may attempt to rejoin a conference after inadvertently being disconnected, e.g., due to a poor internet connection.

At block 470, the host's client device 320 has determined that the additional participant is not in the original participant list. The host's client device 320 thus rejects the additional participant; the additional participant is not admitted to the meeting. In some examples, the meeting then continues.

In this example, the host and other participants do not inherently trust the video conference provider 310. For instance, if video conference provider 310 presents a participant, the host's client device 320 does not automatically admit the participant. While FIG. 4 is described in terms of the host's client device 320 performing these steps, in some examples, a trusted server, such as a server managed by the host's organization, may instead be responsible for handling the admission or rejection of additional participants.

At block 480, the host's client's device 320 ends the current meeting in response to rejection of the additional participant and then restarts the encrypted meeting as a second encrypted video conference. Such examples may provide a higher level of security by changing the cryptographic keys. In examples where the meeting cryptographic key changes during the video conference, the host's client device 320 may also transmit a notification to the video conference provider 310 an indication that the meeting cryptographic key has changed and a corresponding timestamp of when the participants changed to use the new meeting cryptographic key. In some examples, however, transmitting a new meeting cryptographic key provides the notification that the meeting cryptographic key has changed.

At block 490, the host's client device 320 has determined that the additional participant exists in the original participant list. In the example shown, the additional participant is then accepted or admitted into the encrypted video conference, and the video conference continues as before.

In some example systems, the host may leave a meeting and be replaced by another participant, who then becomes the host. In some such examples, the new host's client device is then responsible for rejecting (or admitting) additional participants. In other examples, the encrypted meeting may be restarted with the new host of the new encrypted meeting when the new host replaces the original host.

It should be appreciated that the method 400 described above is only one example according to this disclosure. In other examples, the blocks described above may be performed in a different order or one or more blocks may be omitted. For example, the order of blocks 450-490 may occur in any suitable order according to different examples or may be omitted or additional steps added.

Figure 5:
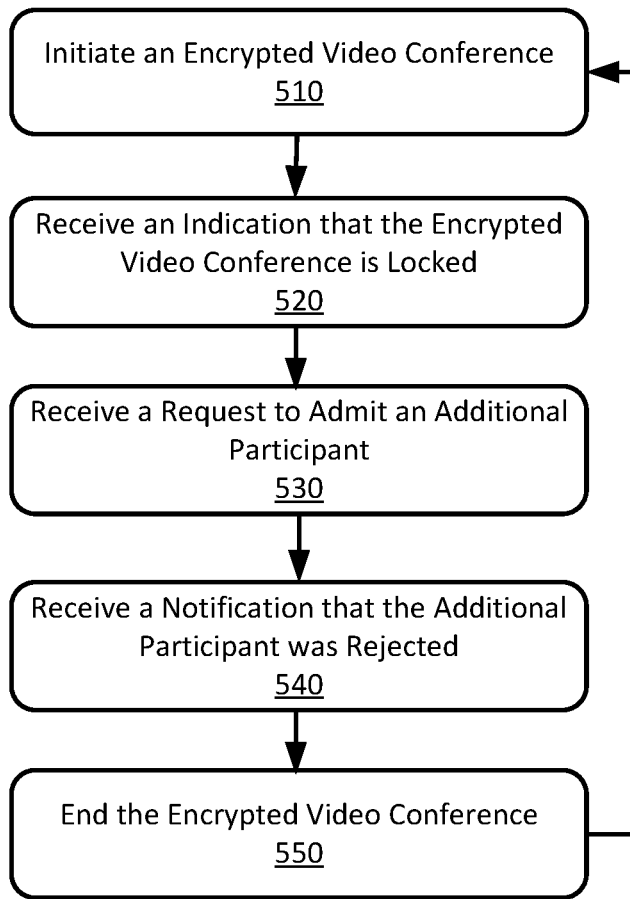

Referring now to FIG. 5, FIG. 5 shows an example method 500 for locking encrypted video conferences. The method 500 of FIG. 5 will be described with respect to the system shown in FIG. 3; however any suitable system according to this disclosure may be employed, including any of the systems shown in FIG. 1-3 or 6.

At block 510, video conference provider 410 initiates an encrypted video conference. A process for initiating such video conferences is described in relation to, for example, FIG. 4.

At block 520, the video conference provider 410 receives an indication that the encrypted video conference has been locked. In this example, the video conference provider 310 receives the indication from the host's computing device 320. In some examples, the video conference provider 410 may record the fact that the conference was locked. For instance, the video conference provider 410 may identify participants in the video conference at the time the lock was indicated for use when additional participants attempt to join the encrypted video conference.

At block 530, the video conference provider 410 receives a request to admit an additional participant. For instance, a user of a client device may access a link to the encrypted video conference. The video conference provider 410 may in response present the additional participant to the encrypted video conference. For example, the video conference provider 410 may transmit a notification to the host's client device 320 indicating that a new participant is attempting to join the video conference.

At block 540, the video conference provider 410 receives a notification that the additional participant was rejected. In the example described in relation to FIG. 4, the additional participant may be rejected because the meeting has been locked, and the additional participant was not in the original list of participants of the encrypted video conference when it was locked by the host.

At block 550, the video conference provider ends the encrypted video conference. For example, the host client device 320 may send a request to end the encrypted video conference in response to receiving a request to join the encrypted video conference from an additional participant who is then rejected. In some examples, the video conference provider initiates another encrypted video conference with which the original participants can join after the original locked encrypted video conference that has been ended. In other words, the original encrypted video conference may be ended and then automatically restarted. If he meeting is restarted, new links may be sent to the original participants.

Figure 6:
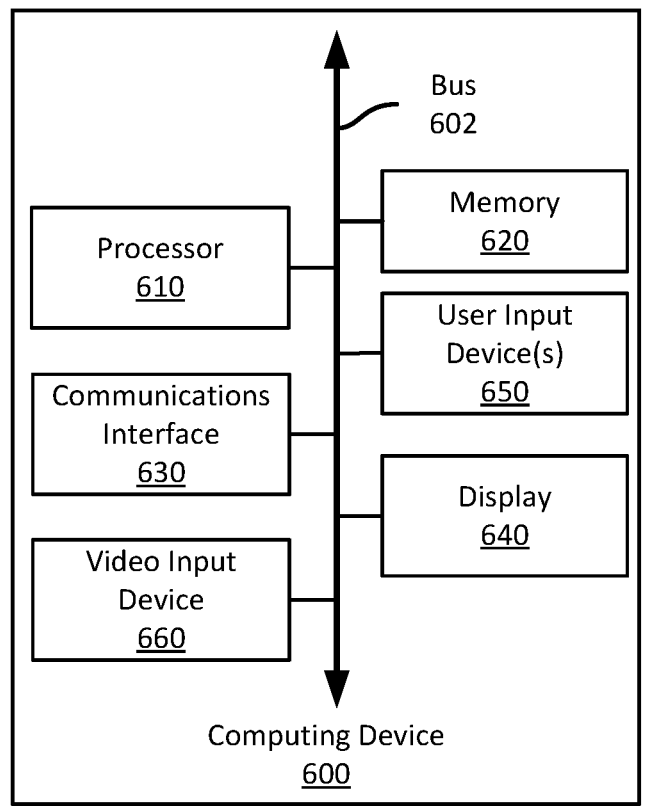
FIG. 6 shows an example computing device suitable for use with any system or method for locking encrypted video conferences according to this disclosure.

Referring now to FIG. 6, FIG. 6 shows an example computing device 600 suitable for use in example systems or methods for identifying at-risk meetings according to this disclosure. The example computing device 600 includes a processor 610 which is in communication with the memory 620 and other components of the computing device 600 using one or more communications buses 602. The processor 610 is configured to execute processor-executable instructions stored in the memory 620 to perform one or more methods for identifying at-risk meetings according to different examples, such as part or all of the example method 400 described above with respect to FIG. 4. The computing device, in this example, also includes one or more user input devices 650, such as a keyboard, mouse, touchscreen, microphone, etc., to accept user input. The computing device 600 also includes a display 640 to provide visual output to a user. The computing device also includes a video input device 260, such as a camera.

The computing device 600 also includes a communications interface 640. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method, comprising:
   generating a first cryptographic key;
   outputting a first command, to a video conference provider, to initiate a locked encrypted video conference, including:
      a plurality of participants; and
      audio and video content encrypted using the first cryptographic key;
   distributing the first cryptographic key to each participant of the plurality of participants;
   rejecting a first request to admit a first additional participant to the locked encrypted video conference;
   generating a second cryptographic key;
   distributing the second cryptographic key to each participant of the plurality of participants and the first additional participant; and
   outputting a second command, to the video conference provider, to restart the locked encrypted video conference, wherein the restarted locked encrypted video conference includes:
      the plurality of participants and the first additional participant; and
      the audio and video content encrypted using the second cryptographic key.

2. The method of claim 1, wherein:
   the first cryptographic key and the second cryptographic key are:
      symmetric cryptographic keys; and
      distributed using public key cryptography; and
   the locked encrypted video conference and the restarted locked encrypted video conference are end-to-end encrypted.

3. The method of claim 2, wherein the first cryptographic key and the second cryptographic key are generated using elliptic curves.

4. The method of claim 1, wherein initiating the locked encrypted video conference comprises:

receiving a second request to initiate an encrypted video conference; and locking the encrypted video conference in response to each of the plurality of participants joining the encrypted video conference.

5. The method of claim 1, further comprising:

determining that a second additional participant is one of the plurality of participants; and accepting a second request to admit the second additional participant to the locked encrypted video conference.

6. The method of claim 1, wherein the locked encrypted video conference further comprises a host role assigned to a first participant of the plurality of participants, wherein the first participant is a host of the locked encrypted video conference, further comprising:

receiving a second request to reassign the host role to a second participant of the plurality of participants; and outputting a third command, to the video conference provider, to restart the locked encrypted video conference, wherein the second participant is a host of the restarted locked encrypted video conference.

7. The method of claim 1, wherein encrypting the audio and video content using the using the first cryptographic key comprises:

determining one or more streams from the audio and video content, wherein each stream comprises a non-secret stream identifier; and for each stream of the one or more streams:
generating a stream encryption key using the corresponding non-secret stream identifier; and
encrypting the stream using the corresponding stream encryption key.

8. The method of claim 1, wherein rejecting the first request to admit the first additional participant to the locked encrypted video conference comprises:

accessing a participant list including identifiers of the plurality of participants;

verifying the authenticity of the participant list using public key cryptography; and determining that the first additional participant is not on the participant list.

9. A system comprising:

a non-transitory computer-readable medium;

a communications interface; and a processor communicatively coupled to the non-transitory computer-readable medium and the communications interface, the processor configured to execute processor-executable instructions stored in the non-transitory computer-readable medium to:

generate a first cryptographic key;

output a first command, to a video conference provider, to initiate a locked encrypted video conference, including:
a plurality of participants; and
audio and video content encrypted using the first cryptographic key;

distribute the first cryptographic key to each participant of the plurality of participants;

reject a first request to admit a first additional participant to the locked encrypted video conference;

generate a second cryptographic key;

distribute the second cryptographic key to each participant of the plurality of participants and the first additional participant; and output a second command, to the video conference provider, to restart the locked encrypted video conference, wherein the restarted locked encrypted video conference includes:
the plurality of participants and the first additional participant; and
the audio and video content encrypted using the second cryptographic key.

10. The system of claim 9, wherein:

the first cryptographic key and the second cryptographic key are:
symmetric cryptographic keys; and
distributed using public key cryptography;

the locked encrypted video conference and the restarted locked encrypted video conference are end-to-end encrypted; and the first cryptographic key and the second cryptographic key are generated using elliptic curves.

11. The system of claim 9, wherein the instruction to initiate the locked encrypted video conference comprises:

receiving a second request to initiate an encrypted video conference; and locking the encrypted video conference in response to each of the plurality of participants joining the encrypted video conference.

12. The system of claim 9, further comprising instructions to:

determine that a second additional participant is one of the plurality of participants; and accept a second request to admit the second additional participant to the locked encrypted video conference.

13. The system of claim 9, wherein the instruction to encrypt the audio and video content using the using the first cryptographic key comprises:

determining one or more streams from the audio and video content, wherein each stream comprises a non-secret stream identifier; and for each stream of the one or more streams:
generating a stream encryption key using the corresponding non-secret stream identifier; and
encrypting the stream using the corresponding stream encryption key.

14. A non-transitory computer-readable medium comprising processor-executable instructions configured to cause one or more processors to:

generate a first cryptographic key;

output a first command, to a video conference provider, to initiate a locked encrypted video conference, including:
a plurality of participants; and
audio and video content encrypted using the first cryptographic key;

distribute the first cryptographic key to each participant of the plurality of participants;

reject a first request to admit a first additional participant to the locked encrypted video conference;

generate a second cryptographic key;

distribute the second cryptographic key to each participant of the plurality of participants and the first additional participant; and output a second command, to the video conference provider, to restart the locked encrypted video conference, wherein the restarted locked encrypted video conference includes:
the plurality of participants and the first additional participant; and
the audio and video content encrypted using the second cryptographic key.

15. The non-transitory computer-readable medium of claim 14, wherein:

the first cryptographic key and the second cryptographic key are:
  symmetric cryptographic keys; and
  distributed using public key cryptography;
the locked encrypted video conference and the restarted locked encrypted video conference are end-to-end encrypted; and
the first cryptographic key and the second cryptographic key are generated using elliptic curves.

16. The non-transitory computer-readable medium of claim 14, wherein the instruction to initiate the locked encrypted video conference comprises:
  receiving a second request to initiate an encrypted video conference; and
  locking the encrypted video conference in response to each of the plurality of participants joining the encrypted video conference.

17. The non-transitory computer-readable medium of claim 14, further comprising instructions to:
  determine that a second additional participant is one of the plurality of participants; and accept a second request to admit the second additional participant to the locked encrypted video conference.

18. The non-transitory computer-readable medium of claim 14, wherein the locked encrypted video conference further comprises a host role assigned to a first participant of the plurality of participants, wherein the first participant is a host of the locked encrypted video conference, further comprising instructions to:
  receive a second request to reassign the host role to a second participant of the plurality of participants; and
  output a third command, to the video conference provider, to restart the locked encrypted video conference, wherein the second participant is a host of the restarted locked encrypted video conference.

19. The non-transitory computer-readable medium of claim 14, wherein the instruction to encrypt the audio and video content using the using the first cryptographic key comprises:
  determining one or more streams from the audio and video content, wherein each stream comprises a non-secret stream identifier; and
  for each stream of the one or more streams:
    generating a stream encryption key using the corresponding non-secret stream identifier; and
    encrypting the stream using the corresponding stream encryption key.

20. The non-transitory computer-readable medium of claim 14, wherein the instruction to reject the first request to admit the first additional participant to the locked encrypted video conference comprises:
  accessing a participant list including identifiers of the plurality of participants;
  verifying the authenticity of the participant list using public key cryptography; and
  determining that the first additional participant is not on the participant list.

\* \* \* \* \*